3,178,427
6-NITRO - DIHYDRO - 1:3 - BENZOXAZINE - 2:4-DI-ONE AND DERIVATIVES THEREOF AND A PROCESS OF MAKING SAME
Alois Gassmann, deceased, late of Basel, Switzerland, by Grete Gassmann, administrator, Basel, Switzerland, and Kurt Engel, Basel, Switzerland, assignors to Robapharm A.G., Basel, Switzerland, a Swiss corporation
No Drawing. Filed June 7, 1962, Ser. No. 200,891
Claims priority, application Switzerland, June 8, 1961, 6,694/61
4 Claims. (Cl. 260—244)

The present invention relates to new substances, i.e. 6-nitro-dihydro-1:3-benzoxazine-2:4-diones which themselves have interesting pharmacodynamic properties or which may be used as intermediate products for preparing pharmaceutically valuable products as, for example, disclosed in Belgian Patent No. 586,064.

Belgian Patent No. 586,064 describes the preparation of benzoxazine diones of the formula:

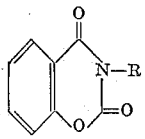

wherein R means an alkyl group with at least 3 carbon atoms and the phenyl radical can be substituted by one or more substituents, for example by nitro groups. These compounds disclosed in said Belgian patent are useful in the treatment of all types of epilepsy, for example grand mal, petit mal, and psychomotor disorders. These compounds can be administered together with a compatible pharmaceutical carrier. Thus, for example, the compounds can be administered by the buccal route together with a vehicle which is acceptible for oral administration, which can be, for example, a liquid, a syrup of elixir or can be a solid, for example a base for tablets, in which case the compounds can be administered in the form of tablets, powders, granules and the like. They can also be administered parenterally in association with a suitable liquid. These compounds are produced by ring formation from substituted or unsubstituted salicylic acid or a salicylic acid derivative of the formula:

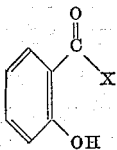

the phenyl nucleus of which may be substituted and X meaning a —NHR group or an etherified hydroxy group, with a compound capable of introducing a carbonyl group and if required a >NR group, wherein R has the above meaning.

The preparation of 6-nitro-dihydro-1:3-benzoxazine-2:4-diones by cyclisation in accordance with Belgian Patent No. 586,064 has the disadvantage that one must proceed from 5-nitro-salicylic acid derivatives. These are expensive since they are produced by nitrating salicylic acid whereby, as is known, a mixture of 3- and 5-nitro-salicylic acid is formed which is difficult to separate.

It has now been discovered that, when nitrating dihydro-1:3-benzoxazine-2:4-diones, the 6-nitro compounds are surprisingly obtained, substantially exclusively in excellent yield and purity, whereas the formation of 8-nitro isomers does not occur. The process of the invention is therefore very economical.

The process of the present invention for preparing 6-nitro-dihydro-1:3-benzoxazine-2:4-diones of the general formula

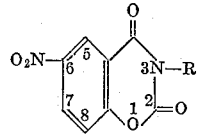

wherein R means hydrogen, an alkyl radical, alkenyl radical or halogen substituted alkyl radical, is characterized by nitrating in a manner known per se a dihydro-1:3-benzoxazine-2:4-dione of the general formula

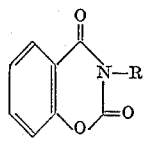

wherein R has the above meaning, and subsequently, if desired, introducing the radical R in 3-position.

The nitration is preferably performed in a mixture of concentrated nitric acid and concentrated sulphuric acid at room temperature or at a slightly elevated temperature. The introduction of the radical R is preferably performed in organic solvents, e.g. dimethyl formamide, at an elevated temperature, e.g. on a boiling water bath, while stirring. After having cooled, the reaction mixture is preferably poured into water and the precipitated product is filtered off.

The present invention will now be explained with reference to the following examples without, however, being restricted thereto.

EXAMPLE 1

*6-nitro-dihydro-1:3-benzoxazine-2:4-dione*

60 g. of dihydro-1:3-benzoxazine-2:4-dione are introduced in small portions into nitrating acid consisting of 400 ml. of sulphuric acid (d.=1.84) and 100 ml. of nitric acid (d.=1.5) at 20–30 C., while stirring vigorously. After having stirred for 4 to 5 hours a clear solution forms which is hereupon poured onto 2.5 kg. of crushed ice. The resultant powderous, colourless mass is extracted by suction, thoroughly washed with water and dried in a vacuum drying chamber. The melting point of the raw product is 242° C. (uncorrected). The raw product is sufficiently pure to be converted into the derivatives thereof substituted in 3-position.

After recrystallization of the resulting raw product from dioxane, the pure product has a melting point of 250–251° C. (uncorr.) and is 63.5 g., which is equal to 88.5% of the theory.

EXAMPLE 2

*6-nitro-dihydro-3-n-propyl-1:3-benzoxazine-2:4-dione*

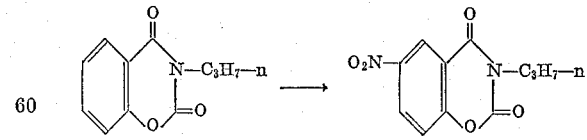

Mixture A.—69.5 ml. of concentrated sulphuric acid (98/100%), 17.6 ml. of concentrated nitric acid (64%).

Substance B.—13.0 g. of 3-n-propyl-dihydro-benzoxazine-2:4-dione.

At a temperature of 10–20° C., substance B is introduced portion-wise into the mixture A being the nitrating acid, then the whole is stirred for a further 2 hours at room temperature, whereupon it is poured onto ice, filtered off by suction, washed with water and dried in vacuo at 80° C. Yield: 14.0 g.=82%, M.P. 129–134° C.

The following compounds were prepared in a similar manner:

6-nitro-dihydro-3-butyl-1:3-benzoxazine-2:4-dione having a melting point of 85° C.
6-nitro-dihydro-3-methyl-1:3-benzoxazine-2:4-dione having a melting point of 159–160° C.
6-nitro-dihydro-3-ethyl-1:3-benzoxazine-2:4-dione having a melting point of 133–135° C.
6-nitro-dihydro-3-allyl-1:3-benzoxazine-2:4-dione having a melting point of 159–161° C.

The following example describes the introduction of substituents in 3-position into the 6-nitro-dihydro-1:3-benzoxazine-2:4-dione obtained as in Example 1.

EXAMPLE 3

*6-nitro-dihydro-3-(2'-chloroethyl)- 1:3-benzoxazine-2:4-dione*

23 g. of the sodium salt of 6-nitro-dihydro-1:3-benzoxazine-2:4-dione are stirred with 120 ml. of dimethyl formamide and 15 g. of 1-bromo-2-chloroethane for 5 hours on a boiling water bath. After having cooled, the whole is poured into water and filtered off by suction. The product has a melting point of 197–199° C. after having been recrystallized from ethyl acetate.

The chlorine derivative obtained in this manner, which contains a mobile chlorine atom, is capable of further reactions. For example, the 6-nitro-dihydro-3-(2-acetoxyethyl) 1:3-benzoxazine-2:4-dione can be prepared by stirring 19 g. of 6-nitro-dihydro-3-(2'-chloroethyl)-1:3-benzoxazine-2:4-dione with 9.6 g. of sodium acetate and 100 ml. of alcohol for 7 hours on a boiling water bath. After being worked up in the conventional manner and recrystallization of the product so obtained from ethyl acetate, it shows a melting point ranging from 169 to 172° C.

What we claim is:

1. A process for preparing 6-nitro-dihydro-1:3-benzoxazine-2:4-dione which comprises bringing a mixture of nitric acid and sulfuric acid into intimate contact with dihydro-1:3-benzoxazine-2:4-dione whereby the 6-position of said dihydro-1:3-benzoxazine-2:4-dione is nitrated.

2. A method for preparing 6-nitro-dihydro-1:3-benzoxazine-2:4-dione of the formula:

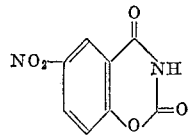

comprising nitrating dihydro-1:3-benzoxazine-2:4-dione of the formula:

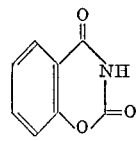

3. A method for preparing 6-nitro-dihydro-1:3-benzoxazine-2:4-dione of the formula:

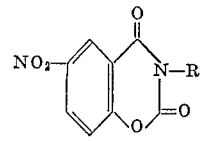

wherein R is alkyl having from 3 to 8 carbon atoms, comprising nitrating a dihydro-1:3-benzoxazine-2:4-dione of the general formula:

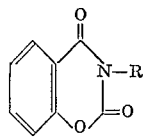

wherein R has the precedingly-recited significance.

4. A method for preparing 6-nitro-dihydro-1:3-benzoxazine-2:4-diones of the formula:

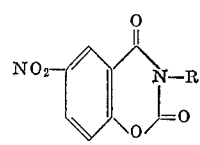

wherein R is alkyl having from 3 to 8 carbon atoms, comprising nitrating a dihydro-1:3-benzoxazine-2:4-dione of the general formula:

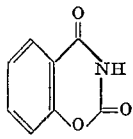

and subsequently introducing in 3-position of the resultant nitro derivative a radical selected from the group consisting of alkyl, alkenyl and halogenalkyl.

References Cited in the file of this patent
UNITED STATES PATENTS
2,978,448    Hasspacher _____ Apr. 4, 1961

FOREIGN PATENTS
586,064    Belgium _____ Dec. 28, 1959

OTHER REFERENCES

Noller: "Chemistry of Organic Compounds," 2nd Ed., p. 272 (1957) (Saunders).